(12) United States Patent
Blair et al.

(10) Patent No.: US 11,639,125 B2
(45) Date of Patent: May 2, 2023

(54) VEHICLE SEAT ASSEMBLY AND METHOD OF ASSEMBLING

(71) Applicant: Lear Corporation, Southfield, MI (US)

(72) Inventors: Samuel Blair, Troy, MI (US); Matthew Wholihan, Southfield, MI (US); Joshua Hallock, Warren, MI (US); David Abdella, Royal Oak, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 17/378,933

(22) Filed: Jul. 19, 2021

(65) Prior Publication Data
US 2023/0020677 A1 Jan. 19, 2023

(51) Int. Cl.
*B60N 2/68* (2006.01)

(52) U.S. Cl.
CPC ........ *B60N 2/682* (2013.01); *B60N 2002/684* (2013.01)

(58) Field of Classification Search
CPC .................................................... B60N 2/682
See application file for complete search history.

(56) References Cited

U.S. PATENT DOCUMENTS

| | | | |
|---|---|---|---|
| 5,671,976 A | 9/1997 | Fredrick | |
| 7,296,839 B2 | 11/2007 | Scheerhorn | |
| 9,126,518 B2 | 9/2015 | Adragna et al. | |
| 9,815,397 B2* | 11/2017 | Hoshi | B60N 2/1615 |
| 2012/0306250 A1* | 12/2012 | Line | B60N 2/682 |
| | | | 297/452.1 |
| 2015/0091358 A1* | 4/2015 | Hattori | B60N 2/682 |
| | | | 297/452.2 |
| 2017/0341553 A1* | 11/2017 | Mizobata | B60N 2/897 |
| 2018/0037138 A1* | 2/2018 | Tanaka | B60N 2/123 |
| 2018/0086241 A1* | 3/2018 | Kimura | B60N 2/682 |
| 2018/0126883 A1* | 5/2018 | Sakaguchi | B60N 2/682 |
| 2018/0334065 A1* | 11/2018 | Suzuki | B60N 2/68 |
| 2020/0307489 A1* | 10/2020 | Line | B60N 2/682 |
| 2021/0138945 A1* | 5/2021 | Yamaguchi | B60N 2/682 |

FOREIGN PATENT DOCUMENTS

| | | | | | |
|---|---|---|---|---|---|
| CN | 109017484 | A | * | 12/2018 | ........... B60N 2/2222 |
| CN | 112140958 | A | * | 12/2020 | ............... B60N 2/42 |
| DE | 202005001773 | U1 | | 6/2006 | |
| DE | 102005033067 | A1 | * | 1/2007 | ........... B60N 2/2222 |
| DE | 102013215613 | A1 | * | 2/2015 | ............... B60N 2/22 |
| DE | 102019207585 | A1 | * | 11/2020 | |
| EP | 3549821 | A1 | * | 10/2019 | ............... B60N 2/68 |
| FR | 3097175 | A1 | * | 12/2020 | ........... B60N 2/1615 |
| JP | 11216037 | A | * | 8/1999 | ............... B60N 2/68 |
| WO | 0189875 | A1 | | 11/2001 | |
| WO | WO-2020201017 | A1 | * | 10/2020 | |

* cited by examiner

*Primary Examiner* — Timothy J Brindley
(74) *Attorney, Agent, or Firm* — Brooks Kushman P.C.

(57) ABSTRACT

A seat assembly includes a first frame with a guide member extending outwardly along a first axis. A second frame has a second guide member extending outwardly. One of the first and second guide members is received in translation along the first axis by the other of the first and second guide members to connect the second frame to the first frame. A first locking element is engaged to couple the first frame to the second frame and limit translational movement of the first frame relative to the second frame. A method of assembling a seat assembly is also provided.

20 Claims, 5 Drawing Sheets

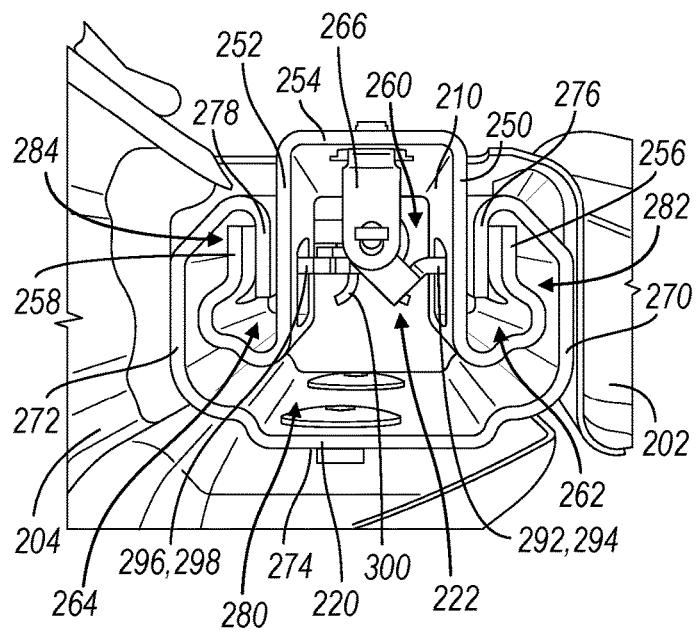
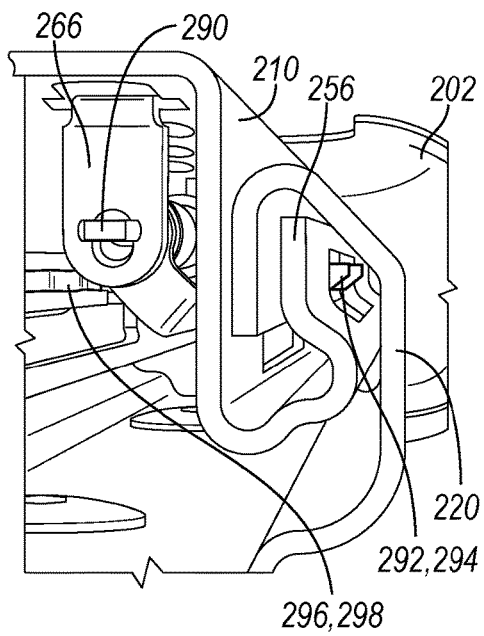
FIG. 3
FIG. 4
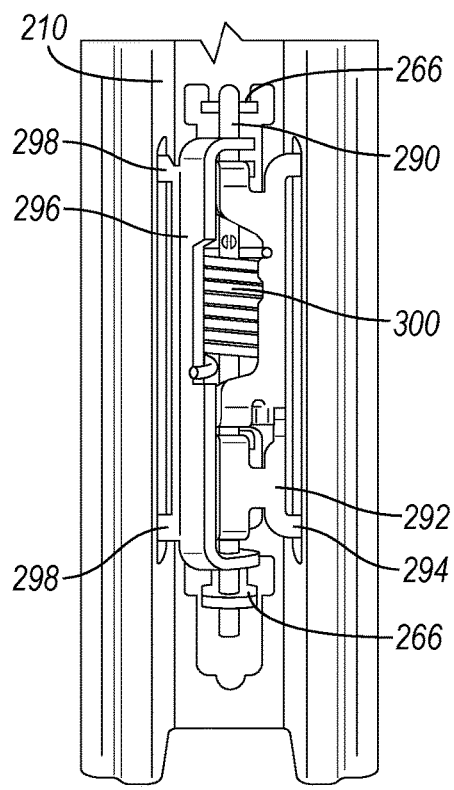
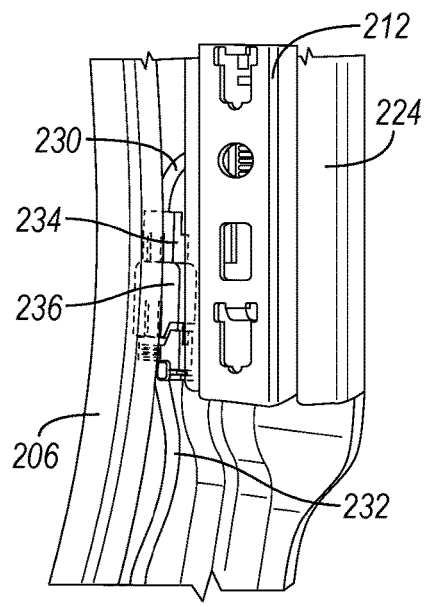
FIG. 5
FIG. 6

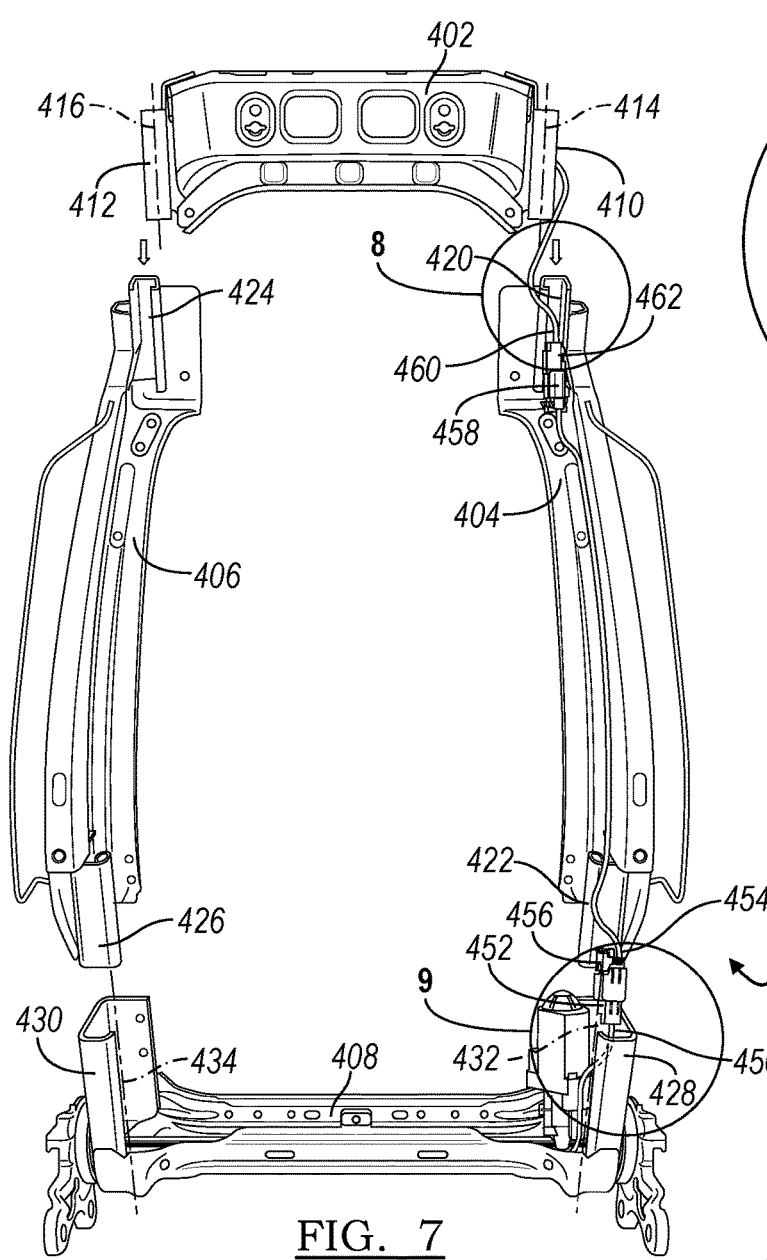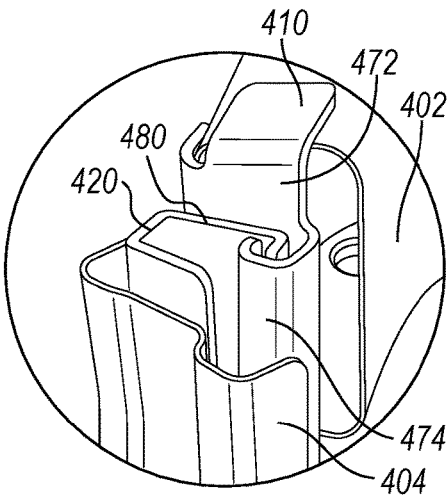
FIG. 8
FIG. 7
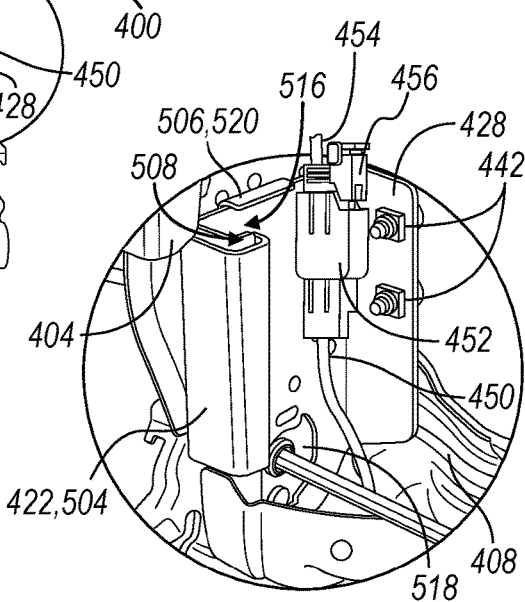
FIG. 9

VEHICLE SEAT ASSEMBLY AND METHOD OF ASSEMBLING

TECHNICAL FIELD

Various embodiments relate to a vehicle seat assembly and a method of assembling the vehicle seat assembly.

BACKGROUND

A vehicle seat assembly may be made from frame components that are connected to one another. Examples of vehicle seat assemblies are shown in U.S. Pat. Nos. 5,671,976, 7,296,839, 9,126,518, PCT Pub. No. WO 01/89875, and German reference DE 202005001773 U1.

SUMMARY

In an embodiment, a seat assembly includes a first frame with a first guide member and a second guide member. The first guide member extends outwardly from the first frame along a first axis, and the second guide member extending outwardly from the first frame along a second axis. A second frame has a third guide member. One of the first and third guide members is received in translation along the first axis by the other of the first and third guide members to connect the second frame to the first frame. A first locking element is positioned adjacent to the first and third guide members to couple the first frame to the second frame and limit translational movement of the first frame relative to the second frame. A third frame with a fourth guide member is provided. One of the second and fourth guide members is received in translation along the second axis by the other of the second and fourth guide members to connect the third frame to the first frame. A second locking element is positioned adjacent to the second and fourth guide members to couple the first frame to the third frame and limit translational movement of the first frame relative to the third frame.

In a further embodiment, the first guide member is constrained for translational movement with only one degree of freedom relative to the second guide member when the first guide member is engaged with the second guide member.

In another further embodiment, the first axis is substantially parallel to the second axis.

In a further embodiment, the first frame is one of an upper cross-member and a lower cross-member for a seat back. The second and third frames provide first and second side frame elements, respectively, for the seat back.

In another further embodiment, a fourth frame is provided with a fifth guide member extending outwardly from the fourth frame along a third axis. The second frame has a sixth guide member positioned opposite to the third guide member. One of the fifth and sixth guide members is slidably received by the other of the fifth and sixth guide members to connect the second frame to the fourth frame by translating the sixth guide member along the third axis. A third locking element is positioned adjacent to the fifth and sixth guide members to couple the second frame to the fourth frame and limit translational movement of the second frame relative to the fourth frame.

In a yet further embodiment, the fourth frame has a seventh guide member extending outwardly from the fourth frame along a fourth axis. The third frame has an eighth guide member positioned opposite to the fourth guide member. One of the seventh and eighth guide members is slidably received by the other of the seventh and eighth guide members to connect the third frame to the fourth frame by translating the eighth guide member along the fourth axis. A fourth locking element is positioned adjacent to the seventh and eighth guide members to couple the third frame to the fourth frame and limit translational movement of the third frame relative to the fourth frame.

In another embodiment, a seat frame assembly includes a first frame with a first guide member extending outwardly from the first frame along a first axis, with the first guide member rigidly connected to the first frame. A second frame is provided with a second guide member extending outwardly from the second frame. The second guide member is rigidly connected to the second frame, and the second guide member is received in translation along the first axis by the first guide member to connect the second frame to the first frame. A locking element is positioned adjacent to the first and second guide members to couple the first frame to the second frame, with the locking element movable along a second axis transverse to the first axis.

In a further embodiment, a first wiring harness has a first connector and is attached to the first frame with the first connector positioned adjacent to the first guide member. A second wiring harness has a second connector and is attached to the second frame with the second connector positioned adjacent to the second guide member. The first and second connectors connect to one another to connect the first wiring harness to the second wiring harness.

In another further embodiment, the first guide member is constrained for translational movement with only one degree of freedom relative to the second guide member when the first guide member is engaged with the second guide member.

In an even further embodiment, the first guide member is formed by a first J-guide, and the second guide member is formed by a second J-guide.

In a yet even further embodiment, the first frame or the first J-guide defines a first aperture extending therethough, and the second frame or the second J-guide defines a second aperture extending therethough. The locking element has a first fastener received through the first and second apertures.

In another yet even further embodiment, one of the first and second J-guides defines a mechanical limit extending transversely to the first axis. The mechanical limit cooperates with the other of the first and second J-guides to limit translational movement of the first frame relative to the second frame along the first axis.

In another even further embodiment, the locking element has a latch connected to one of the first and second guide members, and a latch pin connected to the other of the first and second guide members. The latch is moveable along the second axis transverse to the first axis between a first position and a second position. The latch captures the latch pin in the second position to limit translational movement of the first frame relative to the second frame along the first axis.

In another even further embodiment, the first guide member is formed by a first rail, and the second guide member is formed by a second rail to nest within the first rail. The first rail defines a first aperture extending therethough. The locking element is connected to the second rail and is movable between a first position and a second position. An end of the locking element extends through the first aperture in the second position to limit translational movement of the first frame relative to the second frame along the first axis. A biasing member extends between the second rail and the locking element to bias the locking element towards the second position.

In a yet even further embodiment, the second rail defines a second aperture extending therethrough, and the end of the locking element extends through the second aperture in the second position.

In another yet even further embodiment, the first rail defines a third aperture extending therethrough, with the third aperture spaced apart from the first aperture along the first axis. The end of the locking element extends through the first aperture to connect the first and second frames in a first condition, and wherein the end of the locking element extends through the third aperture to connect the first and second frames in a second condition.

According to an embodiment, a method of assembling a seat assembly is provided. A first guide member is inserted into a second guide member to connect a first frame to a second frame by translating the first guide member relative to the second guide member along a first axis. The first guide member is rigidly connected to and extends outwardly from the first frame along the first axis. The second guide member is rigidly connected to and extends outwardly from the second frame. The first guide member is constrained for translational movement with only one degree of freedom relative to the second guide member when the first guide member is inserted into the second guide member. A first locking element adjacent to the first and second guide members is engaged to couple the first frame to the second frame and limit translational movement of the first frame relative to the second frame along the first axis. The first locking element is engaged by moving the first locking element in a direction transverse to the first axis.

In a further embodiment, a third guide member is inserted into a fourth guide member to connect the first frame to a third frame by translating the third guide member relative to the fourth guide member along a second axis. The third guide member extends outwardly from the first frame along the second axis, and the fourth guide member extends outwardly from the third frame. The third guide member is constrained for translational movement with only one degree of freedom relative to the fourth guide member when the third guide member is inserted into the fourth guide member. A second locking element adjacent to the second and fourth guide members is engaged to couple the first frame to the third frame and limit translational movement of the first frame relative to the third frame along the second axis. The second locking element is engaged by moving the second locking element in a direction transverse to the second axis.

In another further embodiment, the first frame is trimmed with a first cushion and a first trim cover prior to inserting the first guide member into the second guide member. The second frame is trimmed with a second cushion and a second trim cover prior to inserting the first guide member into the second guide member.

In a further embodiment, a first wiring harness with a first connector is installed onto the first frame prior to inserting the first guide member into the second guide member. A second wiring harness with a second connector is installed onto the second frame prior to inserting the first guide member into the second guide member. The first connector is connected with the second connector to connect the first wiring harness to the second wiring harness after inserting the first guide member into the second guide member.

BRIEF DESCRIPTION OF THE DRAWINGS

FIG. 3 illustrates a partial sectional view of the vehicle seat frame assembly of FIG. 2;

FIG. 4 illustrates a partial perspective view of FIG. 3;

FIG. 5 illustrates a front view of a locking element according to an embodiment and for use with the vehicle seat frame assembly of FIG. 2;

FIG. 6 illustrates a partial perspective view of wiring harnesses of the vehicle seat frame assembly of FIG. 2;

FIG. 7 illustrates an exploded front perspective view of a vehicle seat frame assembly according to another embodiment;

FIG. 8 illustrates a detailed perspective view of the vehicle seat frame assembly of FIG. 7;

FIG. 9 illustrates another detailed perspective view of the vehicle seat frame assembly of FIG. 7;

DETAILED DESCRIPTION

As required, detailed embodiments of the present disclosure are provided herein; however, it is to be understood that the disclosed embodiments are merely examples, and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
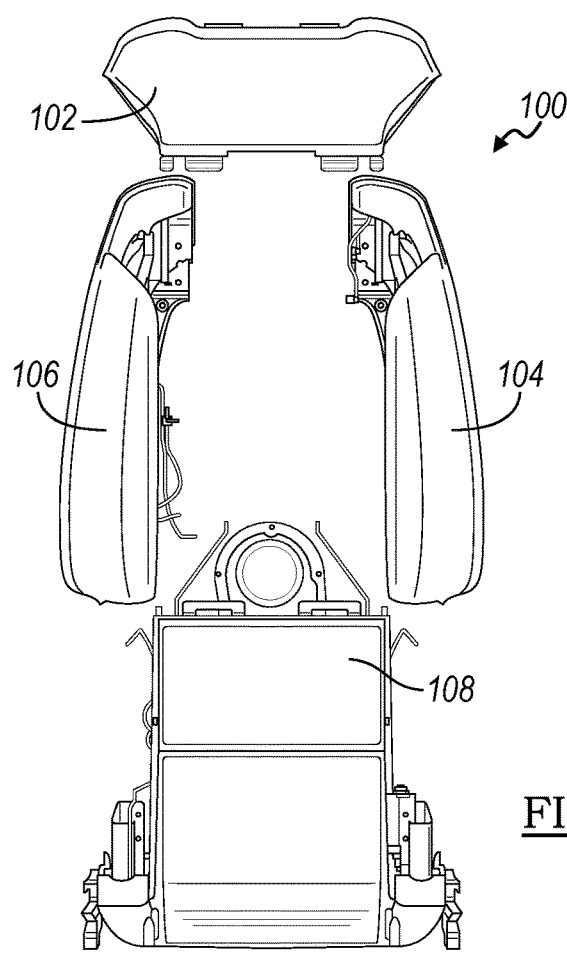
FIG. 1 illustrates an exploded view of a vehicle seat assembly according to an embodiment.

FIG. 1 illustrates an exploded view of a seat back 100 for a vehicle seat assembly. The vehicle seat assembly also may include a seat cushion or seat base, as well as a heat rest or head restraint. The following description describes the assembly of a seat back 100 for the vehicle seat assembly; however, a vehicle seat base, a head restraint, or another vehicle seating component or other seating component may be assembled as described herein. Likewise, two components, e.g. a head restraint to a seat back, may be assembled to one another via the present disclosure.

The seat back 100 is shown as having four frames 102, 104, 106, 108 that are assembled to one another to form the vehicle seat back or a seat frame assembly 110. In other examples, other numbers of frames, including three or fewer frames, or more than four frames, is also contemplated. Frame 102 is an upper bolster, frame 104 is a side frame, frame 106 is another side frame, and frame 108 is a lower bolster. In the present example, the lower bolster frame 108 also supports the central region of the seat back.

Each of the frames 102, 104, 106, 108 has an underlying structural frame as described below, which may be formed from metal or the like. Each of the frames 102, 104, 106, 108 may also be provided with one or more cushion or foam materials, as well as a trim cover made from a natural or synthetic material, such as leather, fabric, vinyl, or the like. The frames 102, 104, 106, 108 of the seat back may be assembled to one another to form the assembly 100 with each frame being fully trimmed as shown, e.g. each frame 102, 104, 106, 108 has the associated cushion material and trim cover assembled to it before the frames are assembled to one another.

Furthermore, and as the frames 102, 104, 106, 108 may be trimmed prior to assembly, various mechanical and electrical components of the assembly 100 are installed onto one or more of the frames prior to assembling the frames to one another. Components include lumbar mechanisms, heaters, pneumatic blowers, power recliner mechanisms, airbags or bladders, massage mechanisms, video screens, a power headrest mechanism, speakers, and the like. As described below, one or more of the frames 102, 104, 106, 108 may support pre-installed wiring harnesses for the components that are also connected to one another when the frames are assembled together. The wiring harnesses provide electrical power and/or data to one or more of the components.

FIGS. 2-6 illustrate a seat frame assembly 200 according to an example. The seat frame assembly 200 may be used to provide a seat back assembly 100 for a vehicle seat assembly as shown in FIG. 1.

The seat frame assembly 200 has a first frame 202, a second frame 204, and a third frame 206. Additional frames may also be provided and are not shown. The first frame 202 is an upper bolster, and extends between and connects the second and third frames 204, 206, each of which is a side frame. A lower bolster may additionally be provided, and may be connected to the side frames in a manner similar to that shown for the upper bolster. Note that each of the first, second and third frames 202, 204, 206 may be fully trimmed prior to assembly to one another; however, the frames are shown without cushion material or trim covers such that the details of the frames may be seen. In various examples, the frame assembly 200 may be assembled with fully trimmed frames without the need to access the frames for insertion or engagement of other fasteners.

The first frame 202 has a first guide member 210 and a second guide member 212, each of which are rigidly connected to the first frame, e.g. via welding and/or mechanical fasteners (as shown). Alternatively, the first and/or second guide members 210, 212 may be integrally formed with the first frame 202. The first guide member 210 extends outwardly from the first frame 202 along a first axis 214. The second guide member 212 extends outwardly from the first frame 202 along a second axis 216. The first and second axes 214, 216 may be parallel or substantially parallel, and each extend in a longitudinal direction for the seat back. Substantially as used herein refers to angles that are within five degrees, ten degrees, fifteen degrees, or twenty degrees. In other examples, the first and second axes 214, 216 are non-parallel.

The second frame 204, or first side frame, has a third guide member 220 positioned adjacent to an upper end of the second frame. The third guide member 220 is rigidly connected to the second frame 204, e.g. via welding and/or mechanical fasteners (as shown). Alternatively, the third guide member 220 may be integrally formed with the second frame 204. The third guide member 220 may be packaged within an interior space or region of the second frame 204. The third guide member 220 extends outwardly from the second frame 204. The third guide member 220 is received in translation along the first axis by the first guide member 210 to connect the second frame 204 to the first frame 202. Alternatively, the first guide member 210 is received in translation along the first axis 214 by the third guide member 220 to connect the second frame 204 to the first frame 202. The first guide member 210 is constrained for translational movement with only one degree of freedom relative to the third guide member 220 when the first guide member 210 is engaged with the third guide member 220. Therefore, when the first and third guide members 210, 220 are engaged, the guide members 210, 220 may only translate relative to one another along the first axis 214, and cannot translate in another direction or rotate relative to one another. The first and third guide members 210, 220 structurally connect the first and second frames 202, 204 to one another.

A first locking element 222 or locking mechanism is used to connect and couple the first frame 202 and the second frame 204. The locking mechanism or first locking element 222 engages the first and second frames 202, 204 to limit translational movement of the frames relative to one another along the first axis 214. In the example shown, the locking mechanism or first locking element 222 engages the first and third guide members 210, 220 to limit translational movement of the first and second frames 202, 204 relative to one another along the first axis 214. The first locking element 222 is movable along an axis transverse to the first axis 214.

The third frame 206, or second side frame, has a fourth guide member 224 positioned adjacent to an upper end of the third frame. The third frame 206 and fourth guide member 224 may be provided as described above with respect to the second frame 204 and third guide member 220. The fourth guide member 224 is received in translation along the second axis 216 by the second guide member 212 to connect the third frame 206 to the first frame 202. Alternatively, the second guide member 212 is received in translation along the second axis 216 by the fourth guide member 224 to connect the third frame 206 to the first frame 202. The fourth guide member 224 is constrained for translational movement with only one degree of freedom relative to the second guide member 212 when the second guide member 212 is engaged with the fourth guide member 224. Therefore, when the second and fourth guide members 212, 224 are engaged, the guide members 212, 224 may only translate relative to one another along the second axis 216, and cannot translate in another direction or rotate relative to one another.

A second locking element 226 or locking mechanism is used to connect and couple the first frame 202 and the third frame 206. The second locking mechanism or locking element 226 engages the first and third frames 202, 206 to limit translational movement of the frames relative to one another along the second axis 216. In a further example, the locking mechanism or second locking element 226 engages the second and fourth guide members 212, 224 to limit translational movement of the first and third frames 202, 206 relative to one another along the second axis 216. The second locking element 226 is movable along an axis transverse to the second axis 216.

FIG. 6 illustrates a first wiring harness 230 supported by or attached to the first frame 202 and a second wiring harness 232 supported by or attached to the third frame 206. The first wiring harness 230 has a first connector 234 positioned adjacent to the second guide member 212. The first and second wiring harnesses 230, 232 may provide electrical power and/or data to one or more components of the seat assembly 100. The second wiring harness 232 has a second connector 236 positioned adjacent to the fourth guide member 224. The first and second connectors 234, 236 engage one another to connect the first wiring harness 230 to the second wiring harness 232. In one example, the first and second connectors 234, 236 are provided by electrical connectors, such as a male and a female plug, metal contact pads and pins, or the like. The first and second connectors 234, 236 may be physically coupled after the first and third frames 202, 206 are connected to one another. Alternatively, the first and second connectors 234, 236 may be positioned such that they are engaged with one another as the first and third frames 202, 206 are translated towards one another and connected. Therefore, the second and fourth guide members 212, 224 may be used to mechanically couple the first and third frames to one another, and the first and second connectors 234, 236 are used to provide an electrical and/or data connection between harnesses on the first and third frames 202, 206.

Each of the guide members 210, 212, 220, 224 may be formed from a rail, such as an extruded rail or stamped rail. With reference to FIGS. 3-4, the first and third guide members 210, 220 are shown, however, the second and fourth guide members 212, 224 are also similarly configured. One of the guide members is sized to nest within the other guide member. In the example shown, the first guide member 210 is nested within the third guide member 220, although the opposite arrangement is also contemplated.

The first guide member 210, or first rail, has first and second inner side walls 250, 252 on either side of a base 254 and extending outwardly therefrom in a first direction, and first and second outer side walls 256, 258 extending outwardly from the first and second inner side walls 250, 252 in a second opposite direction. The first guide member 210 forms a first central recess 260 defined by the base 254 and the first and second inner side walls 250, 252, a second recess 262 defined between the first inner side wall 250 and the first outer side wall 256, and a third recess 264 formed between the second inner side wall 252 and the second outer side wall 258. The base 254 forms tabs 266 that extend into the first recess 260 and support the locking element 222. Each of the first and second inner walls 250, 252 and the first and second outer walls 256, 258 define apertures extending transversely therethrough.

The third guide member 220, or third rail, has first and second outer side walls 270, 272 on either side of a base 274 and extending outwardly therefrom in a first direction, and first and second inner side walls 276, 278 extending outwardly from the first and second inner side walls 270, 272 in a second opposite direction towards the base 274. The third guide member 220 forms a first central recess 280 defined by the base 274 and the first and second inner side walls 276, 278, a second recess 282 defined between the first inner side wall 276 and the first outer side wall 270, and a third recess 284 formed between the second inner side wall 278 and the second outer side wall 272. Each of the first and second inner walls 276, 278 define apertures extending transversely therethrough.

When the first and third guide members 210, 220 are connected to one another, the first and second outer walls 256, 258 of the first guide member are received within the second and third recesses 282, 284 of the third guide member. The first and second inner walls 276, 278 of the third guide member are received within the second and third recesses 262, 264 of the first guide member. The first guide member 210 or first rail therefore nests within the third guide member 220 or third rail.

A locking element 222 according to one example is illustrated in FIGS. 3-5. The second locking element 226 may be provided with a similar structure to the first locking element 222. The first locking element 222 has a support member 290 that is connected to the tabs 266 of the first guide member. A first latch 292 is rotatably connected to the support member 290 and extends to an end 294. A second latch 296 is also rotatably coupled to the support member 290 and extends to an end 298. A biasing member 300, such as a torsion spring or other spring, is supported by the support member 290 and is engaged with both of the first latch 292 and the second latch 296.

Each latch 292, 296 moves between a first position and a second position. The biasing member 300 biases each of the first and second latches 292, 296 towards the second position. When the first and second latches 292, 296 are each in their first position, their respective ends 294, 298 are inboard of the inner side walls 276, 278 of the third guide member 220 such that the first and third guide members 210, 220 may translate relative to one another. When the apertures in the side walls of the first and third guide members 210, 220 overlap one another, the ends 294, 298 of the first and second latches 292, 296 extend through the apertures in the side walls, as the first and second latches 292, 296 are biased by the biasing member 300 towards their second positions to couple the first and third frames and limit translational movement of the first and third frames relative to one another along the first axis 214. In the second position, the end 294 of the first latch 292 extends through apertures in the first inner wall 250 of the first guide member, the first inner wall 276 of the third guide member, and the first outer wall 270 of the first guide member. In the second position, the end 298 of the second latch 296 extends through apertures in the second inner wall 252 of the first guide member, the second inner wall 278 of the third guide member, and the second outer wall 272 of the first guide member.

The first and/or third guide members 210, 220 may have a series of apertures spaced apart from one another along the first axis 214 and extending through their side walls such that the first locking element 222 may couple the first frame 202 to the second frame 204 at a plurality of positions along the first axis 214, thereby changing or adjusting the overall length of the frame assembly 100 along the first axis 214, and allowing the first and second frames 202, 204 to be connected in a first condition with a first length, and a second condition with a second length.

Furthermore, the first locking element 222 may be provided with a release lever or release input for a person to release the first locking element 222 by imparting a force on the biasing member 300 and moving the first and second latches 292, 296 towards the first position to change the position of the first and second frames relative to one another via translation.

In further examples, the first locking element 222 may further have a lead in member that engages the third guide member 220 to cause the first and second latches 292, 296 to move towards the first position and exert an external force on the biasing member 300. The third guide member 220 may be provided with another aperture or window to receive the lead in member and release the biasing member 300 to engage the latches 292, 296 when the first and third guide members 210, 220 are in the appropriate position relative to one another.

The seat frame assembly may also have a fourth frame, or lower bolster, that connects to the second and third frames 204, 206 via associated guide members in a similar manner as to how the first frame 202 is connected to the second and third frames 204, 206. Third and fourth locking elements may likewise be provided to connect a lower bolster frame to the two side frames 204, 206.

Figure 10:
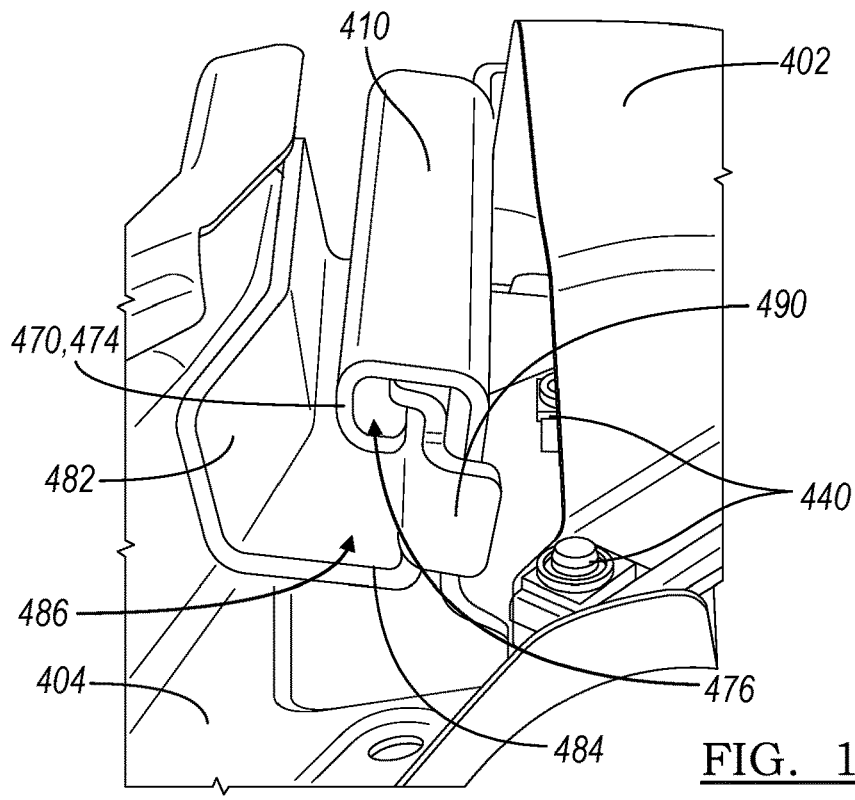
FIG. 10 illustrates a partial perspective view of the upper portion of the vehicle seat frame assembly of FIG. 7.
Figure 11:
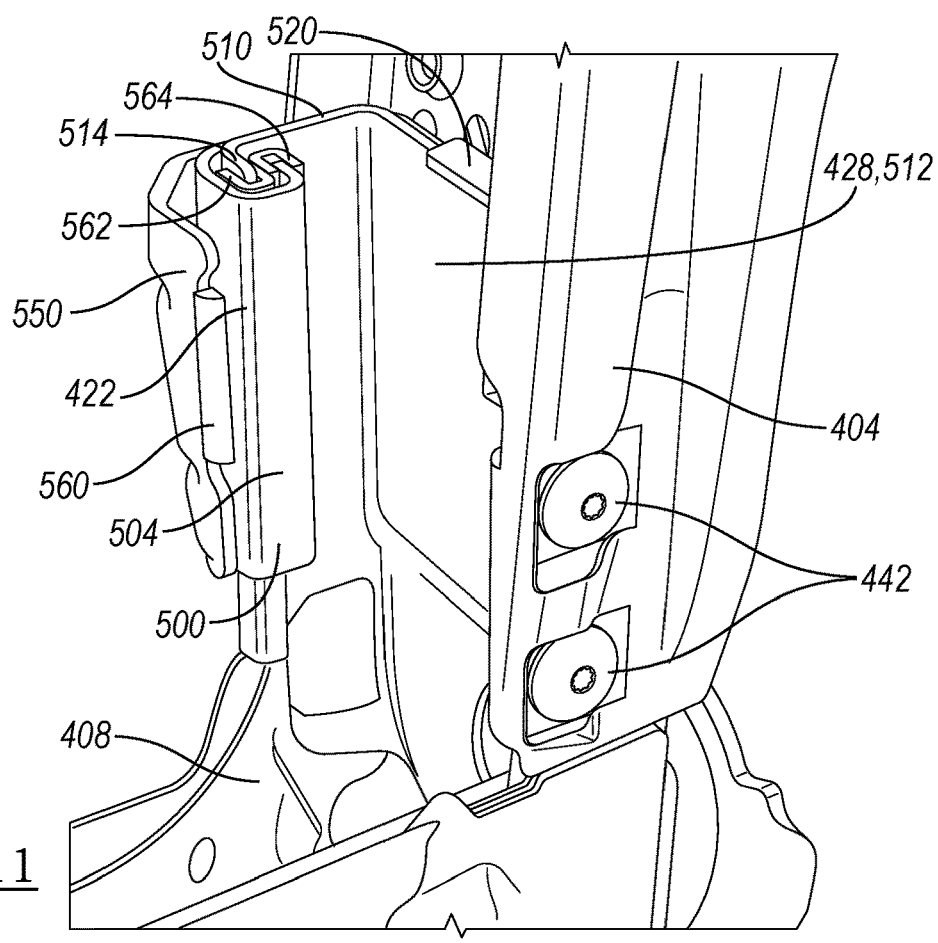
FIG. 11 illustrates a partial perspective view of the upper portion of the vehicle seat frame assembly of FIG. 7 according to a further embodiment.

FIGS. 7-11 illustrate a seat frame assembly 400 according to another example. The seat frame assembly 400 may be used to provide a seat back assembly 100 for a vehicle seat assembly as shown in FIG. 1. FIG. 11 illustrates a further variation on the example shown in FIGS. 7-10.

As shown in FIG. 7, the seat frame assembly 400 has a first frame 402, a second frame 404, a third frame 406, and a fourth frame 408. The first frame 402 is an upper bolster, and extends between and connects the second and third frames 404, 406, each of which is a side frame. The fourth frame 408 is a lower bolster, and extends between and connects the second and third frames 404, 406. Note that each of the first, second, third, and fourth frames 402, 404, 406, 408 may be fully trimmed prior to assembly to one another; however, the frames are shown without cushion material or trim covers such that the details of the frames may be seen. For fully trimmed frame(s) 402, 404, 406, 408, access to the locking members may be provided from a rear surface or region of the seat assembly 400, and a rear panel or rear trim may be removably attached to the seat assembly.

The first frame 402 has a first guide member 410 and a second guide member 412, each of which are rigidly connected to the first frame, e.g. via welding (as shown) and/or mechanical fasteners. Alternatively, the first and/or second guide member 410, 412 may be integrally formed with the first frame. The first guide member 410 extends outwardly from the first frame 402 along a first axis 414. The second guide member 412 extends outwardly from the first frame 402 along a second axis 416. The first and second axes 414, 416 may be parallel or substantially parallel, and each extend in a longitudinal direction for the seat back. In other examples, the first and second axes 414, 416 are non-parallel.

The second frame 404, or first side frame, has a third guide member 420 positioned adjacent to an upper end of the second frame 404, and a fourth guide member 422 positioned adjacent to the lower end of the second frame 404. The third and fourth guide members 420, 422 are rigidly connected to the second frame 404, e.g. via welding and/or mechanical fasteners (as shown). Alternatively, the third guide and fourth guide members 420, 422 may be integrally formed with the second frame 404. The third and fourth guide members 420, 422 may be packaged within an interior space or region of the second frame 404. The third and fourth guide members 420, 422 extends outwardly from the second frame 404.

The third frame 406, or second side frame, has a fifth guide member 424 positioned adjacent to an upper end of the third frame 406, and a sixth guide member 426 positioned adjacent to the lower end of the third frame 406. The third frame 406 may be provided similar to that described above with respect to the second frame 404.

The fourth frame 408, or lower bolster, has a seventh guide member 428 and an eighth guide member 430, each of which are rigidly connected to the fourth frame 408, e.g. via welding (as shown) and/or mechanical fasteners. Alternatively, the seventh and/or eighth guide member 428, 430 may be integrally formed with the fourth frame 408. The seventh guide member 428 extends outwardly from the fourth frame 408 along a third axis 432. The eighth guide member 430 extends outwardly from the fourth frame 408 along a fourth axis 434. The third and fourth axes 432, 434 may be parallel or substantially parallel, and each extend in a longitudinal direction for the seat back. In other examples, the third and fourth axes 432, 434 are non-parallel.

As shown in FIGS. 8 and 10, to connect the second frame 404 to the first frame 402, the third guide member 420 is received in translation along the first axis 414 by the first guide member 410. Alternatively, the first guide member 410 is received in translation along the first axis 414 by the third guide member 420 to connect the second frame 404 to the first frame 402. The first guide member 410 is constrained for translational movement with only one degree of freedom relative to the third guide member 420 when the first guide member 410 is engaged with the third guide member 420. Therefore, when the first and third guide members 410, 420 are engaged, the guide members 410, 420 may only translate relative to one another along the first axis 414, and cannot translate in another direction or rotate relative to one another. The first and third guide members 410, 420 structurally connect the first and second frames 402, 404 to one another.

A first locking element 440 or locking mechanism is used to connect and couple the first frame 402 and the second frame 404. The first locking mechanism 440 or locking element cooperates with the first and second frames 402, 404 to limit translational movement of the frames 402, 404 relative to one another along the first axis 414. The first locking element 440 is movable along an axis transverse to the first axis 414. The first and third guide members 410, 420 and the first locking element 440 are described in greater detail below with reference to FIGS. 8 and 10.

To connect the third frame 406 to the first frame 402, the fifth guide member 424 is received in translation along the second axis 416 by the second guide member 412, or vice versa. A second locking element similar to the first locking element 440 is used to connect the first and third frames 402, 406. The connection provided by the second and fifth guide members 412, 424 is similar to that described above with respect to the first and third guide members 410, 420 and first locking element 440 as shown in FIGS. 8 and 10.

As shown in FIGS. 9 and 11, to connect the fourth frame 408 to the second frame 404, the seventh guide member 428 is received in translation along the third axis 432 by the fourth guide member 422, or vice versa. A third locking element 442 is used to connect the second and fourth frames 404, 406. The connection provided by the fourth and seventh guide members 422, 428 is similar to that described above with respect to the first and third guide members 401, 420 and first locking element 440, and is described in greater detail below with reference to FIGS. 9 and 11.

To connect the fourth frame 408 to the third frame 406, the eighth guide member 430 is received in translation along the fourth axis 434 by the sixth guide member 426, or vice versa, similar to that described in FIGS. 9 and 11. A fourth locking element similar to the third locking element 442 is used to connect the third and fourth frames 406, 408. The connection provided by the sixth and eighth guide members 426, 430 is similar to that described above with respect to the first and third guide members and first locking element.

FIGS. 7 and 9 illustrate wiring harnesses 450, 454, 460 for the seat frame assembly 400. In FIG. 7, a first wiring harness 450 is supported by or attached to the fourth frame 408, a second wiring harness 454 is supported by or attached to the second frame 404, and a third wiring harness 460 is supported by or attached to the first frame 402. The first, second, and third wiring harnesses 450, 454, 460 may provide electrical power and/or data to one or more components of the seat assembly. The first wiring harness 450 has a first connector 452 positioned adjacent to the seventh guide member 428. The second wiring harness 454 has a second connector 456 positioned adjacent to the fourth guide member 422, and a third connector 458 positioned adjacent to the third guide member 420. The third wiring harness 460 has a fourth connector 462 positioned adjacent to the first guide member 410. The first and second connectors 452, 456 engage one another to connect the first wiring harness 450 to the second wiring harness 454. The third and fourth connectors 458, 462 engage one another to connect the second wiring harness 454 to the third wiring harness 460. In one example, the connectors 452, 456, 458, 462 are provided by electrical connectors, such as male and female plugs, metal contact pads and pins, or the like. The connectors 452, 456, 458, 462 may be physically coupled after the frames are connected to one another. Alternatively, the connectors 452, 456, 458, 462 may be positioned such that they are engaged with one another as the associated frames are translated towards one another and connected. Therefore, the guide members may be used to mechanically couple the frames to one another, and the connectors are used to provide an electrical and/or data connection between harnesses on the associated frames. In other examples, the harnesses 450, 454, 460 and associated connectors may additionally or alternatively include tubing for pneumatic systems, or the like.

With reference to FIGS. 8 and 10, the first guide member 410 is formed by one J-guide or J-track or J-hook, and the third guide member 420 is formed by another J-guide or J-track or J-hook. The first guide member 410 is connected at one end region to the first frame 402, and extends along the first axis to a free, distal end 470. The first guide member 410 has a first support member 472 and a first flange 474 that is shaped to form a concave surface and define a first recess 476. The first flange 474 may be shaped or curved such that it is opposite to the first support member 472 to form a slot therebetween, with the slot acting as an entry to the first recess.

The third guide member 420 is connected at one end region to the second frame 404, and extends along the second axis to a free, distal end 480. The third guide member 420 has a third support member 482 and a third flange 484 that is shaped to form a concave surface and define a third recess 486. The third flange 484 may be shaped or curved such that it is opposite to the third support member 482 to form a slot therebetween, with the slot acting as an entry to the third recess 486.

The third guide member 420 also forms a mechanical limit 490 extending transversely to the first axis 414. The mechanical limit 490 cooperates with the first guide member 410 to limit translational movement of the first frame 402 relative to the second frame 404 along the first axis 414. The mechanical limit 490 may also act to align the apertures to receive the locking element 440, as described below. In the example shown, the mechanical limit 490 is formed by a tab. The mechanical limit 490 or tab extends transversely to the first axis 414. The mechanical limit 490 or tab may engage an end face of the flange 474 of the first guide member 410 as shown in FIG. 10. The mechanical limit 490 or tab may be integrally formed with the third guide member 420. In one example, the mechanical limit or tab is formed as a flange or other protrusion that is bent, folded, or otherwise formed to extend transversely to the first axis 414. The mechanical limit 490 or tab may extend outwardly from an end region of the third flange 484 of the third guide member 420. In other examples, the first guide member 410 may form the mechanical limit.

When the first and third guide members 410, 420 are engaged with one another, the first flange 474 is received within the third recess 486, and the third flange 484 is received within the first recess 476. Additionally, the distal end 470 of the first guide member 410 is in contact with the mechanical limit 490.

The first frame 402 and/or the first guide member 410 defines a first pair of apertures extending therethough. The second frame 404 and/or the third guide member 420 defines a second pair of apertures extending therethough. A first locking element 440, provided by a pair of fasteners, such as a bolt and nut, are used to connect the first and second frames 402, 404. The pair of fasteners 440 is received by the pair of apertures, as shown in FIG. 10. In the example shown, each fastener 440 extends through apertures in the first frame 402, the first guide member 410, and the second frame 404; however, the fasteners 440 do not extend through the third guide member 420.

The second and fifth guide members 412, 424, and associated locking element, may be provided similar to that described above with reference to FIGS. 8 and 10 to connect the first and third frames 402, 406.

With reference to FIGS. 9 and 11, the fourth guide member 422 is formed by one J-guide or J-track or J-hook, and the seventh guide member 428 is formed by another J-guide or J-track or J-hook. The fourth guide member 422 is connected at one end region to the second frame 404, and extends to a free, distal end 500. The fourth guide member 422 has a fourth support member 502 and a fourth flange 504 that is shaped to form a concave surface and define a fourth recess 506. The fourth flange 504 may be shaped or curved such that it is opposite to the fourth support member 502 to form a slot therebetween, with the slot acting as an entry to the fourth recess 506.

The seventh guide member 428 is connected at one end region to the fourth frame 408, and extends along the third axis 432 to a free, distal end 510. The seventh guide member 428 has a seventh support member 512 and a seventh flange 514 that is shaped to form a concave surface and define a seventh recess 516. The seventh flange 514 may be shaped or curved such that it is opposite to the seventh support member 512 to form a slot therebetween, with the slot acting as an entry to the seventh recess 516. The seventh guide member 428 may be connected to or adjacent to a recliner mechanism 518 for a vehicle seat assembly.

The fourth guide member 422 also forms a mechanical limit 520 extending transversely to the third axis 432. The mechanical limit 520 cooperates with the seventh guide member 428 to limit translational movement of the second frame 404 relative to the fourth frame 408 along the third axis 432. The mechanical limit 520 may also act to align the apertures to receive the locking element 442, as described below. In the example shown, the mechanical limit 520 is formed by a tab. In other examples, the seventh guide member 428 may form the mechanical limit.

When the fourth and seventh guide members 422, 428 are engaged with one another, the fourth flange 504 is received within the seventh recess 516, and the seventh flange is received within the fourth recess 508. Additionally, the distal end 510 of the seventh guide member 428 is in contact with the mechanical limit 520.

The second frame 404 and/or the fourth guide member 422 defines a first pair of apertures extending therethough. The fourth frame 408 and/or the seventh guide member 428 defines a second pair of apertures extending therethough. A third locking element 442, provided by a pair of fasteners, such as a bolt and nut, are used to connect the second and fourth frames 404, 408. The pair of fasteners 442 is received by the pair of apertures, as shown in FIG. 9. In the example shown, each fastener 442 extends through apertures in the second frame 404 and the seventh guide member 428; however, the fasteners 442 do not extend through the fourth guide member 422 or the fourth frame 404.

The sixth and eighth guide members 426, 430, and associated locking element, may be provided similar to that described above with reference to FIGS. 9 and 11 to connect the third and fourth frames 406, 408.

FIG. 11 illustrates a further embodiment of the seat assembly as shown in FIGS. 7-10. In FIG. 11, an additional reinforcement bracket 550 is used, and is attached directly to or integrated with the frame 404. In one example, the bracket 550 is welded to an outer surface of the frame 404. Reinforcement brackets similar to bracket 550 may likewise be provided at other locations on the frames adjacent to other guide members connecting the seat frame assembly 400.

Additionally, FIG. 11 illustrates a first insert 560, a second insert 562, and a third insert 564. One or more of the inserts 560, 562, 564 may be attached to the associated frame element or guide member. Alternatively, one or more of the inserts 560, 562, 564 may be formed as a coating or film on the associated frame element or guide member. The inserts 560, 562, 564 may be formed from a plastic or other material with a lower coefficient of friction than the surface of the guide members, e.g. such that the guide members slide easily relative to one another for assembly. The inserts 560, 562, 564 may additionally or alternatively be provided to reduce noise and rattle. Inserts may additionally or alternatively be used with other guide members connecting the frames.

Figure 12:
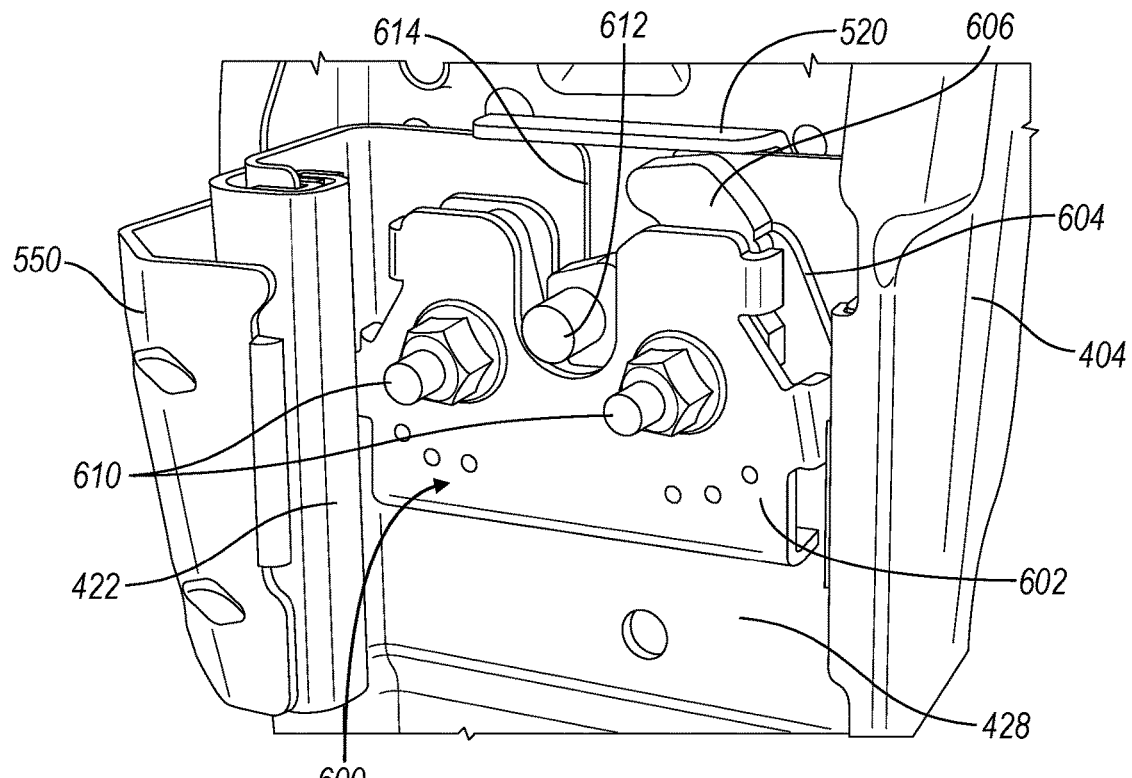
FIG. 12 illustrates a partial perspective view of the vehicle seat frame assembly with a locking element according to an embodiment.
Figure 13:
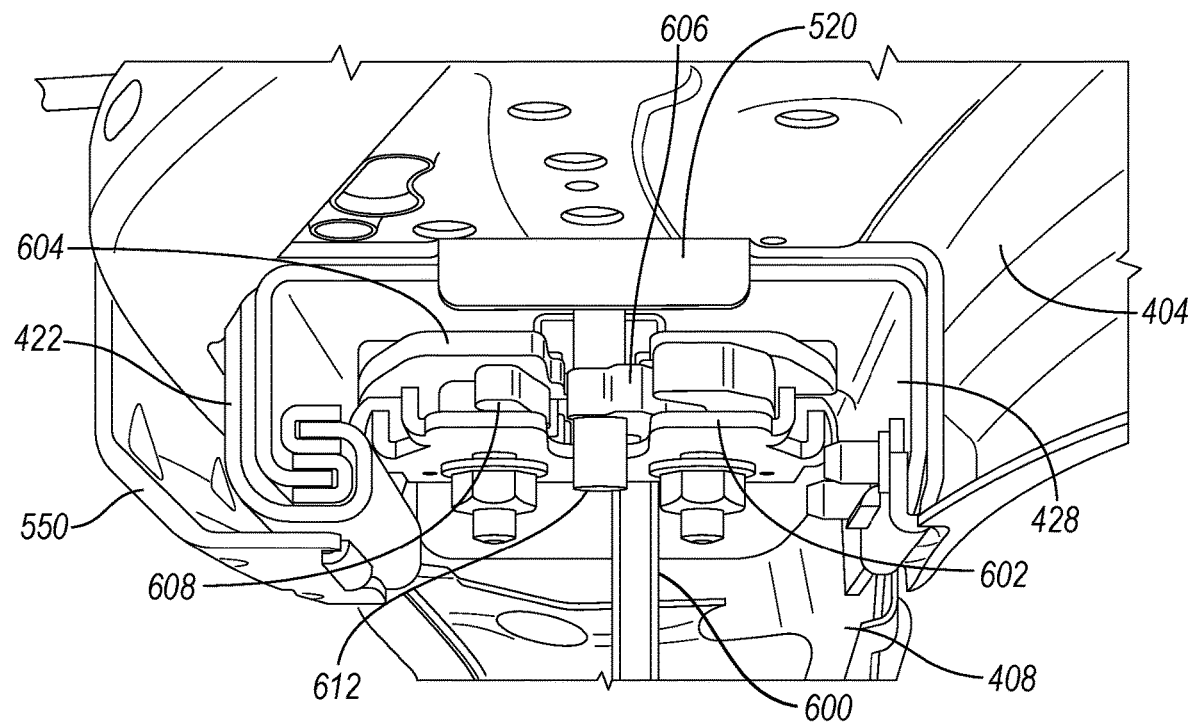
FIG. 13 illustrates another partial perspective view of the vehicle seat frame assembly and locking element of FIG. 12.

FIGS. 12-13 illustrate a locking element 600 or locking mechanism to connect and couple the second frame 404 to the fourth frame 408. The locking mechanism or locking element 600 may be used in place of fasteners as described above with reference to FIGS. 7-11, and may be used to connect other frame elements to one another to assemble the seat assembly. The locking mechanism 600 engages the frames 404, 408 to limit translational movement of the frames relative to one another along the axis 432. In the example shown, the locking mechanism or locking element 600 engages the guide members 422, 428 to limit translational movement of the frames 404, 408 relative to one another along the axis 432.

The locking element 600 may be provided by a rotary latch mechanism, such as a single rotor or double rotor latch mechanism, and with a single state of two stages. According to one example, and as shown, the locking element 600 has a first support plate 602 and a second support plate 604, with the two support plates connected to the guide member 428 and frame 408. A latch 606 is rotatably connected to the support plates 602, 604. A biasing member, such as a torsion spring or other spring, may additionally be provided and supported by the locking element, and engaged with the latch 606 to bias the latch 606. A release arm 608 is also provided and is rotatably connected to the support plates 602, 604. The latch 606 moves between a first, open position and a second, locked position, with the second position shown in FIGS. 12-13. The latch 606 of the locking element 600 moves or rotates about an axis transverse to the axis 432.

The release arm 608 may engage the latch 606 to maintain the latch 606 in the second closed or locking position. In other examples, the locking element 600 may be provided with only a first support plate 602 and without a second support plate 604, with the latch 606 and the release arm 608 rotatably supported by the first support plate and the guide member 428. The latch 606 and release arm 608 may be rotatably supported by fasteners 610 such as bolts, rivets, or the like.

A latch pin 612 or striker is supported by the other frame 404. The latch pin 612 may be directly connected to the guide member 422. A slot 614 is formed in the guide member 428, with the slot extending along the axis 432. The latch pin 612 is received by and slides within the slot when the frames 404, 408 are being assembled or disassembled.

To assemble the frames 404, 408, the guide members 422, 428 are aligned and translated with respect to one another, and the latch pin 612 slides within the slot 614 along axis 432. When the latch pin 612 reaches the latch 606 in an open position, the latch 606 moves to the second position to capture the latch pin 612. The release arm 608 engages the latch 606 to maintain the latch in the second, closed position to couple the frame 404, 408 to one another and limit translational movement of the frames 404, 408 relative to one another along the axis 432. The release arm may be moved to release the latch 606 to the first, open position.

Figure 2:
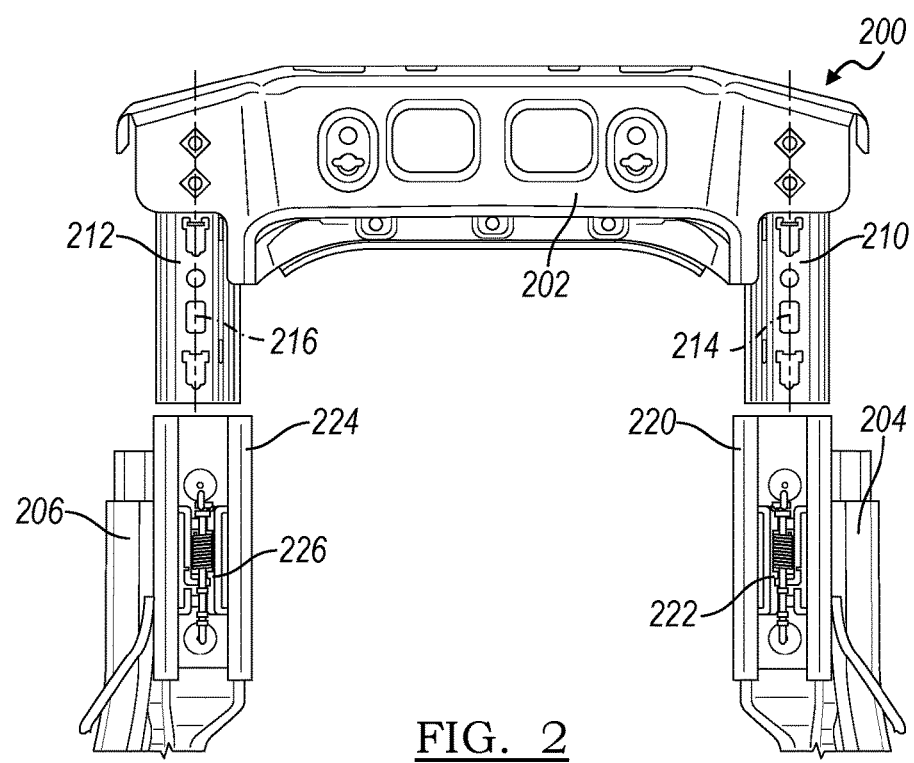
FIG. 2 illustrates a partial exploded view of a vehicle seat frame assembly according to an embodiment.

A method of assembling a seat assembly, such as the seat assembly shown in FIG. 1, 2, or 7 is provided. In various examples, the steps of the method may be performed in another order, performed simultaneously or sequentially, and/or steps may be added or omitted.

A first guide member is inserted into a second guide member to connect a first frame to a second frame by translating the first guide member relative to the second guide member along a first axis. The first guide member is rigidly connected to and extends outwardly from the first frame along the first axis. The second guide member is rigidly connected to and extends outwardly from the second frame. The first guide member is constrained for translational movement with only one degree of freedom relative to the second guide member when the first guide member is inserted into the second guide member.

A third guide member is inserted into a fourth guide member to connect the first frame to a third frame by translating the third guide member relative to the fourth guide member along a second axis. The third guide member extends outwardly from the first frame along the second axis, and the fourth guide member extends outwardly from the third frame. The third guide member is constrained for translational movement with only one degree of freedom relative to the fourth guide member when the third guide member is inserted into the fourth guide member.

A first locking element adjacent to the first and second guide members is engaged to couple the first frame to the second frame and limit translational movement of the first frame relative to the second frame along the first axis. The first locking element is engaged by moving the first locking element in a direction transverse to the first axis.

A second locking element adjacent to the second and fourth guide members is engaged to couple the first frame to the third frame and limit translational movement of the first frame relative to the third frame along the second axis. The second locking element is engaged by moving the second locking element in a direction transverse to the second axis. The guide members and locking elements may be provided as described above with respect to FIGS. 2-11.

A first frame is trimmed with a first cushion and a first trim cover prior to inserting the first guide member into the second guide member. The second frame is trimmed with a second cushion and a second trim cover prior to inserting the first guide member into the second guide member.

A first wiring harness with a first connector is installed onto the first frame prior to inserting the first guide member into the second guide member. A second wiring harness with a second connector is installed onto the second frame prior to inserting the first guide member into the second guide member. The first connector is connected with the second connector to connect the first wiring harness to the second wiring harness after inserting the first guide member into the second guide member.

Various embodiments according to the present disclosure have associated, non-limiting advantages. For example, modular attachment feature is provided for use with a seat frame assembly such as a vehicle seat assembly. Two vehicle seat modules or components are attached to one another during assembly using guide members such as sliding rails or J-guides that are provided on each of the components, and that mate with one another. The guide members may allow for mechanical, and electrical and/or data connections between the two modules in one action or movement. The modules may also be fully trimmed when they are connected to one another using the guide members. Examples of frames or modules are the upper and lower cross bar sections, and the two side members of a vehicle seat back. After two frames or modules are connected using the guide members, a bolt or fastener may be run through the modules to complete the attachment. Alternatively, the frames or modules may have inner locking elements or mechanisms within the guide members that engage to complete the attachment such that no external fastener is needed.

While exemplary embodiments are described above, it is not intended that these embodiments describe all possible forms of the invention or disclosure. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat frame assembly comprising:
   a first frame with a first guide member extending outwardly from the first frame along a first axis, the first guide member rigidly connected to the first frame;
   a second frame with a second guide member extending outwardly from the second frame, the second guide member rigidly connected to the second frame, wherein the second guide member is received in translation along the first axis by the first guide member to connect the second frame to the first frame; and
   a locking element positioned adjacent to the first and second guide members to couple the first frame to the second frame, the locking element movable along a second axis transverse to the first axis;
   wherein the first guide member is constrained for translational movement with only one degree of freedom relative to the second guide member when only the first guide member is engaged with the second guide member;
   wherein the first guide member is formed by a first J-guide; and
   wherein the second guide member is formed by a second J-guide.

2. The seat frame assembly of claim 1 further comprising a first wiring harness having a first connector, the first wiring harness attached to the first frame with the first connector positioned adjacent to the first guide member; and
   a second wiring harness having a second connector, the second wiring harness attached to the second frame with the second connector positioned adjacent to the second guide member, wherein the first and second connectors connect to one another to connect the first wiring harness to the second wiring harness.

3. The seat frame assembly of claim 1 wherein the first frame or the first J-guide defines a first aperture extending therethough, and wherein the second frame or the second J-guide defines a second aperture extending therethough; and
   wherein the locking element has a first fastener received through the first and second apertures.

4. The seat frame assembly of claim 1 wherein one of the first and second J-guides defines a mechanical limit extending transversely to the first axis, wherein the mechanical limit cooperates with the other of the first and second J-guides to limit translational movement of the first frame relative to the second frame along the first axis.

5. The seat frame assembly of claim 1 wherein the locking element limits translational movement of the first frame relative to the second frame.

6. The seat frame assembly of claim 1 wherein the first frame has a third guide member extending outwardly from the first frame along a third axis, the third guide member rigidly connected to the first frame;
   wherein the seat frame assembly further comprises a third frame with a fourth guide member extending outwardly from the third frame, the fourth guide member rigidly connected to the third frame, wherein the fourth guide member is received in translation along the third axis by the third guide member to connect the third frame to the first frame; and
   a second locking element positioned adjacent to the first and third guide members to couple the first frame to the third frame, the second locking element movable along a fourth axis transverse to the third axis.

7. The seat frame assembly of claim 6 wherein the first axis is substantially parallel to the third axis.

8. The seat frame assembly of claim 6 wherein the first frame is one of an upper cross-member and a lower cross-member for a seat back; and
   wherein the second and third frames provide first and second side frame elements, respectively, for the seat back.

9. The seat frame assembly of claim 6 wherein the locking element has a latch connected to one of the first and second guide members, and a latch pin connected to the other of the first and second guide members, wherein the latch is moveable along the second axis transverse to the first axis between a first position and a second position, wherein the latch captures the latch pin in the second position to limit translational movement of the first frame relative to the second frame along the first axis.

10. A method of assembling a seat assembly, the method comprising:
    inserting a first guide member into a second guide member to connect a first frame to a second frame by translating the first guide member relative to the second guide member along a first axis, the first guide member rigidly connected to and extending outwardly from the first frame along the first axis, and the second guide member rigidly connected to and extending outwardly from the second frame, wherein the first guide member is constrained for translational movement with only one degree of freedom relative to the second guide member when the first guide member is inserted into the second guide member; and
    engaging a first locking element adjacent to the first and second guide members to couple the first frame to the second frame and limit translational movement of the first frame relative to the second frame along the first axis, the first locking element engaged by moving the first locking element in a direction transverse to the first axis;
    trimming the first frame with a first cushion and a first trim cover prior to inserting the first guide member into the second guide member; and trimming the second frame with a second cushion and a second trim cover prior to inserting the first guide member into the second guide member.

11. The method of claim 10 further comprising inserting a third guide member into a fourth guide member to connect the first frame to a third frame by translating the third guide member relative to the fourth guide member along a second axis, the third guide member extending outwardly from the first frame along the second axis, and the fourth guide member extending outwardly from the third frame, wherein the third guide member is constrained for translational movement with only one degree of freedom relative to the fourth guide member when the third guide member is inserted into the fourth guide member; and engaging a second locking element adjacent to the second and fourth guide members to couple the first frame to the third frame and limit translational movement of the first frame relative to the third frame along the second axis, the second locking element engaged by moving the second locking element in a direction transverse to the second axis.

12. The method of claim 10 further comprising:

installing a first wiring harness with a first connector onto the first frame prior to inserting the first guide member into the second guide member;

installing a second wiring harness with a second connector onto the second frame prior to inserting the first guide member into the second guide member; and connecting the first connector with the second connector to connect the first wiring harness to the second wiring harness while inserting the first guide member into the second guide member.

13. A seat frame assembly comprising:

a first frame with a first guide member extending outwardly from the first frame along a first axis, the first guide member rigidly connected to the first frame;

a second frame with a second guide member extending outwardly from the second frame, the second guide member rigidly connected to the second frame, wherein the second guide member is received in translation along the first axis by the first guide member to connect the second frame to the first frame;

a locking element positioned adjacent to the first and second guide members to couple the first frame to the second frame, the locking element movable along a second axis transverse to the first axis;

a first wiring harness having a first connector, the first wiring harness attached to the first frame with the first connector positioned adjacent to the first guide member; and a second wiring harness having a second connector, the second wiring harness attached to the second frame with the second connector positioned adjacent to the second guide member, wherein the first and second connectors connect to one another to connect the first wiring harness to the second wiring harness.

14. The seat frame assembly of claim 13 wherein the first guide member is constrained for translational movement with only one degree of freedom relative to the second guide member when the first guide member is engaged with the second guide member.

15. The seat frame assembly of claim 13 wherein the first and second wiring harnesses are configured to provide at least one of electrical power or data.

16. The seat frame assembly of claim 13 wherein the first frame is one of an upper cross-member and a lower cross-member for a seat back; and wherein the second frame provides a side frame element for the seat back.

17. The seat frame assembly of claim 13 wherein the locking element limits translational movement of the first frame relative to the second frame.

18. The seat frame assembly of claim 13 wherein the first guide member is formed by a first rail;

wherein the second guide member is formed by a second rail to nest within the first rail;

wherein the first rail defines a first aperture extending therethough;

wherein the locking element is connected to the second rail and is movable between a first position and a second position, wherein an end of the locking element extends through the first aperture in the second position to limit translational movement of the first frame relative to the second frame along the first axis; and wherein the seat frame assembly further comprises a biasing member extending between the second rail and the locking element, wherein the biasing member biases the locking element towards the second position.

19. The seat frame assembly of claim 18 wherein the second rail defines a second aperture extending therethrough; and wherein the end of the locking element extends through the second aperture in the second position.

20. The seat frame assembly of claim 18 wherein the first rail defines a third aperture extending therethrough, the third aperture spaced apart from the first aperture along the first axis; and wherein the end of the locking element extends through the first aperture to connect the first and second frames in a first condition, and wherein the end of the locking element extends through the third aperture to connect the first and second frames in a second condition.

* * * * *